United States Patent [19]

Anglin

[11] Patent Number: 5,002,368
[45] Date of Patent: Mar. 26, 1991

[54] LIQUID CRYSTAL DISPLAY MOUNTING STRUCTURE

[75] Inventor: Noah L. Anglin, San Jose, Calif.

[73] Assignee: Poqet Computer Corporation, Sunnyvale, Calif.

[21] Appl. No.: 359,191

[22] Filed: May 31, 1989

[51] Int. Cl.$^5$ ............................................. G02F 1/13
[52] U.S. Cl. ..................................... 350/334; 248/634
[58] Field of Search ............. 248/560, 632, 633, 634, 248/638, 27.1, 27.3; 350/334, 336

[56] References Cited

U.S. PATENT DOCUMENTS

| | | | |
|---|---|---|---|
| 3,689,131 | 9/1972 | Klein | 350/334 |
| 4,012,117 | 3/1977 | Lazzery | 350/334 |
| 4,025,162 | 5/1977 | Yagi | 350/334 |
| 4,234,947 | 11/1980 | Matsumoto | 350/334 |
| 4,260,224 | 4/1981 | Takayama | 350/334 |
| 4,514,042 | 4/1985 | Nukii | 350/334 |
| 4,514,920 | 5/1985 | Shafrir | 350/334 |
| 4,515,440 | 5/1985 | Mosier | 350/334 |

Primary Examiner—David M. Purol
Assistant Examiner—Robert A. Olson
Attorney, Agent, or Firm—Skjerven, Morrill, MacPherson, Franklin & Friel

[57] ABSTRACT

A structure for mounting a liquid crystal display (LCD) in a portable computer and a method for making the mounting structure are described. The mounting structure absorbs the shocks associated with day-to-day handling of the portable computer including occasional dropping or compressing and thereby protects the LCD from damage. The mounting structure consists of resilient shock absorbers mounted along the edges or at the corners of the LCD and glass assembly which are sealed with the LCD glass and circuitry behind a transparent overlay while under compression. The sealed mounting structure acts as a suspension system which allows the LCD glass to float along a single plane only. Any shocks due to dropping, compressing, bending or deflecting are absorbed by the shock absorbers and the LCD remains unaffected. The mounting structure may be evacuated and hermetically sealed, which provides protection to the LCD glass and circuitry from humidity, dust and other contaminates as well.

26 Claims, 3 Drawing Sheets

LIQUID CRYSTAL DISPLAY MOUNTING STRUCTURE

BACKGROUND OF THE INVENTION

This invention relates to a structure for mounting a liquid crystal display (LCD) in a portable computer housing and a method for making the mounting structure.

Conventionally, computers do not have impact absorption features to protect fragile components, such as LCDs, from damage due to dropping or other day-to-day handling of the computer. The conventional computer LCDs are mounted in a metal frame which structurally supports the LCD, but offers little protection against damage. Conventional lap-top computers are more prone to damage because they are transported more frequently. The conventional lap-top computer offers no more protection against damage to its fragile components, such as its LCD, than desk-top computers. Only the size of the computer and the location of the fragile structures within are factors which might reduce the potential for damage should the lap-top computer be dropped.

As portable computers become smaller, their associated compact structures have even less damage prevention capability. Furthermore, the more compact the portable computer is, the more frequently it will be transported. If the portable computer is transported more frequently during day-to-day use, the probability that it will be dropped, sat on, bent or otherwise mishandled increases. Therefore, the fragile LCD is more vulnerable to damage as the size of the computer decreases. Impact absorption features must be designed into the portable computer to minimize this vulnerability and make the portable computer durable over its lifetime.

SUMMARY OF THE INVENTION

It is therefore an object of this invention to provide a structure which can effectively absorb the impact of stress related to day-to-day handling of a portable computer. According to this invention, a mounting structure for a LCD is provided which absorbs the shock from dropping and bending a portable computer, and thereby prevents damage to the LCD. A method for making this mounting structure is provided which includes resilient shock absorbers, made from Sorbothane TM or low durometer silicone rubber for example, dimensionally sized and mounted along the edges of the LCD. The resilient material has elastic properties which give it compressibility as well as the ability to recover its original shape. The resilient shock absorbers are placed under a pre-load during assembly, wherein the preload is determined by factors such as the mass and the gravity-loading needed to support the LCD. The shock absorbers are typically compressed by a three dimensional frame which provides a stiff structure so that the combined effect of the shock absorbers and the frame offer maximum protection to the LCD. During use, the resilient shock absorbers will absorb energy from deflecting, bending and dropping. The LCD and the shock absorbers are installed into a computer housing. After assembly into a computer housing, the mounting structure acts as a suspension system which supports the glass LCD and allows the glass to remain planar with bending of the housing. In a preferred embodiment, a transparent overlay is installed over the LCD assembly and hermetically sealed to the computer housing using a bezel which frames the transparent overlay and LCD. Moreover, the LCD assembly can be evacuated before sealing the structure in order to protect the LCD from potentially trapped moisture, dust and other contaminants from the surrounding environment.

DETAILED DESCRIPTION OF THE INVENTION

Figure 1:
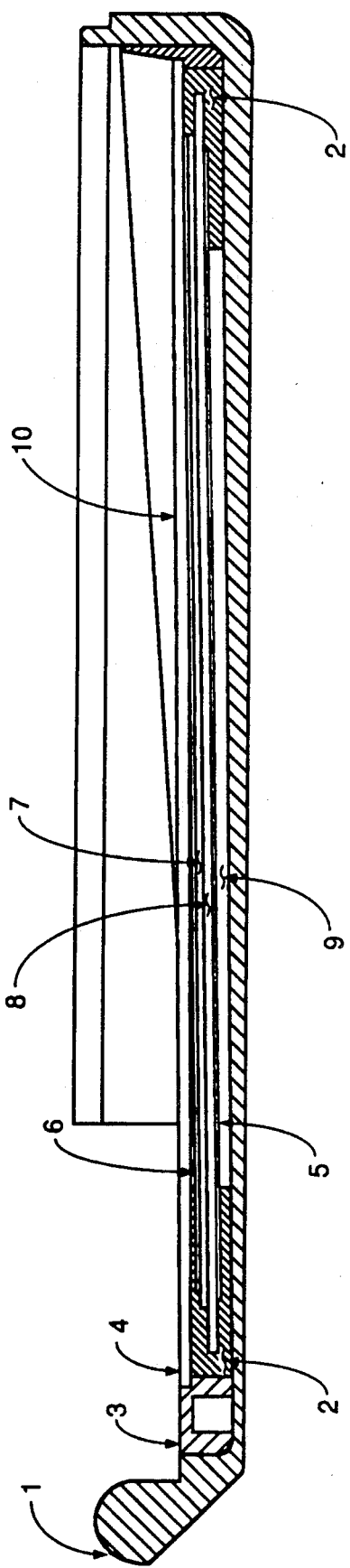
FIG. 1 is a cross-sectional view illustrating the housing assembly and the associated mounting structure of this invention.
Figure 3:
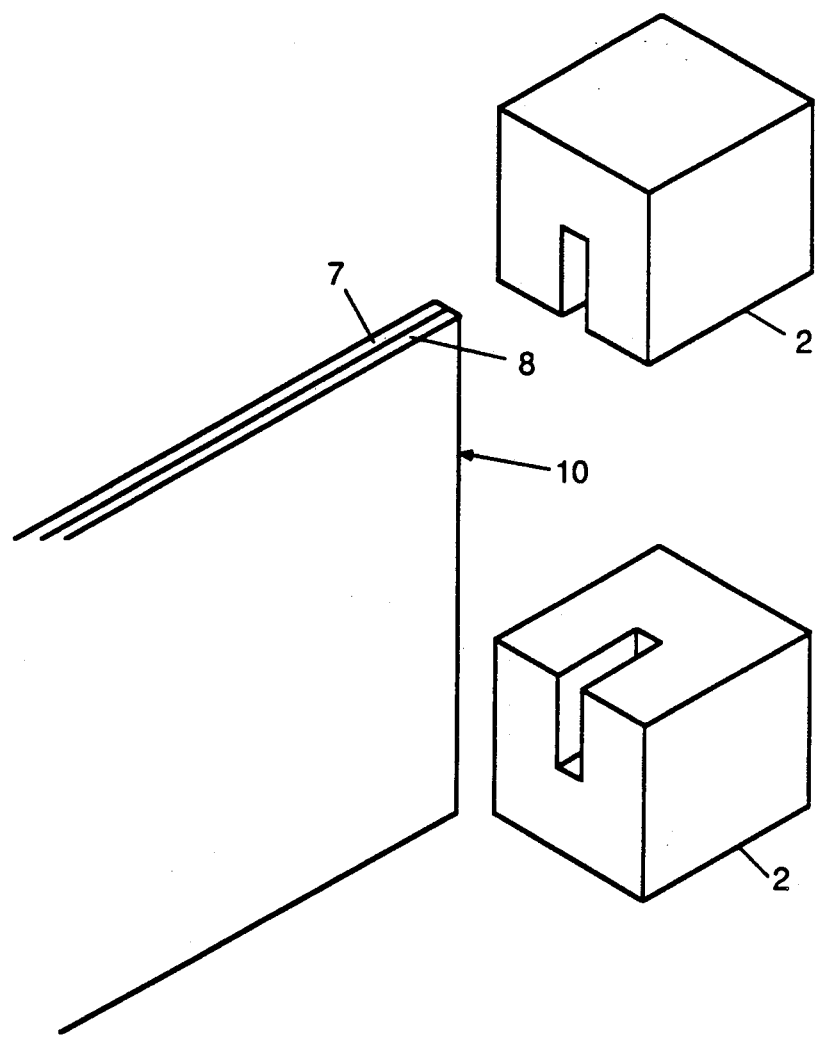
FIG. 3 is a perspective view of a preferred shape of the shock mounts.

FIG. 1 illustrates a housing 1 which houses the mounting structure of this invention. The mounting structure holds an LCD assembly 10 within the housing 1. The LCD assembly 10 comprises a top glass 7 and a bottom glass 8, each glass preferably including a polarizer between which is located the liquid crystal material and its electrical controls. Polarizer 6 is located on the LCD assembly top glass 7 and polarizer with reflector 5 is located on the LCD assembly bottom glass 8. The polarizers control the ambient light into and the reflected light out of the LCD, in particular reducing glare. LCD assembly 10 has a row driver printed circuit board, a column driver printed circuit board, and flexible circuitry (all not shown) associated with LCD assembly 10. At each of the four corners of the LCD assembly 10, shock mounts 2 are mounted. The shock mounts 2 are made from a rubber material having resiliency, so that they are compressible but recover their original shape after the load is removed. The resilient material used for shock mounts 2 is preferably Sorbothane TM or a silicone rubber with a low durometer in the range of 15-20, for example. The shock mounts 2 are molded to conform to the corners of the joined pair of glasses 7 and 8. Shock mount 2 is preferably shaped as shown in FIG. 3 to include a pocket having the dimensions of a corner 25 portion of LCD assembly 10, the associated printed/flexible circuitry. The LCD assembly 10 and shock mounts 2 are placed into the housing 1. Shock mounts 2 are compressed and a bezel 3 and transparent overlay 4 are installed. The bezel 3 and the transparent overlay 4 are attached together prior to installation, either by ultrasonic welding or by chemical bonding, or may preferably be molded as one piece which thereby eliminates several assembly steps. Once the bezel 3 and transparent overlay 4 are installed over the LCD assembly 10 and shock mounts 2, pressure is applied to the bezel assembly 3 and 4 to compress the underlying shock mounts 2 by some amount, preferably to 75% of their original volume. While under compression, the bezel assembly 3 and 4 is ultrasonically welded or chemically bonded to the housing to seal the structure. This bonding step allows the thickness of bezel assembly 3 and 4 to form a 3-dimensional structure with the flat housing 1, thereby producing a structure with much greater stiffness than the individual components 1, 3, and 4. This stiffness combined with the resiliency of shock mounts 2 offers maximum protection to LCD assembly 10.

In a preferred embodiment, the assembly is evacuated by pulling a vacuum during the assembly process just prior to hermetic sealing. Once hermetically sealed, the LCD assembly 10 is protected from the atmosphere and contamination, namely from humidity, dust, and dirt. Although evacuation and hermetic sealing are preferred, they are by no means required.

Figure 2:
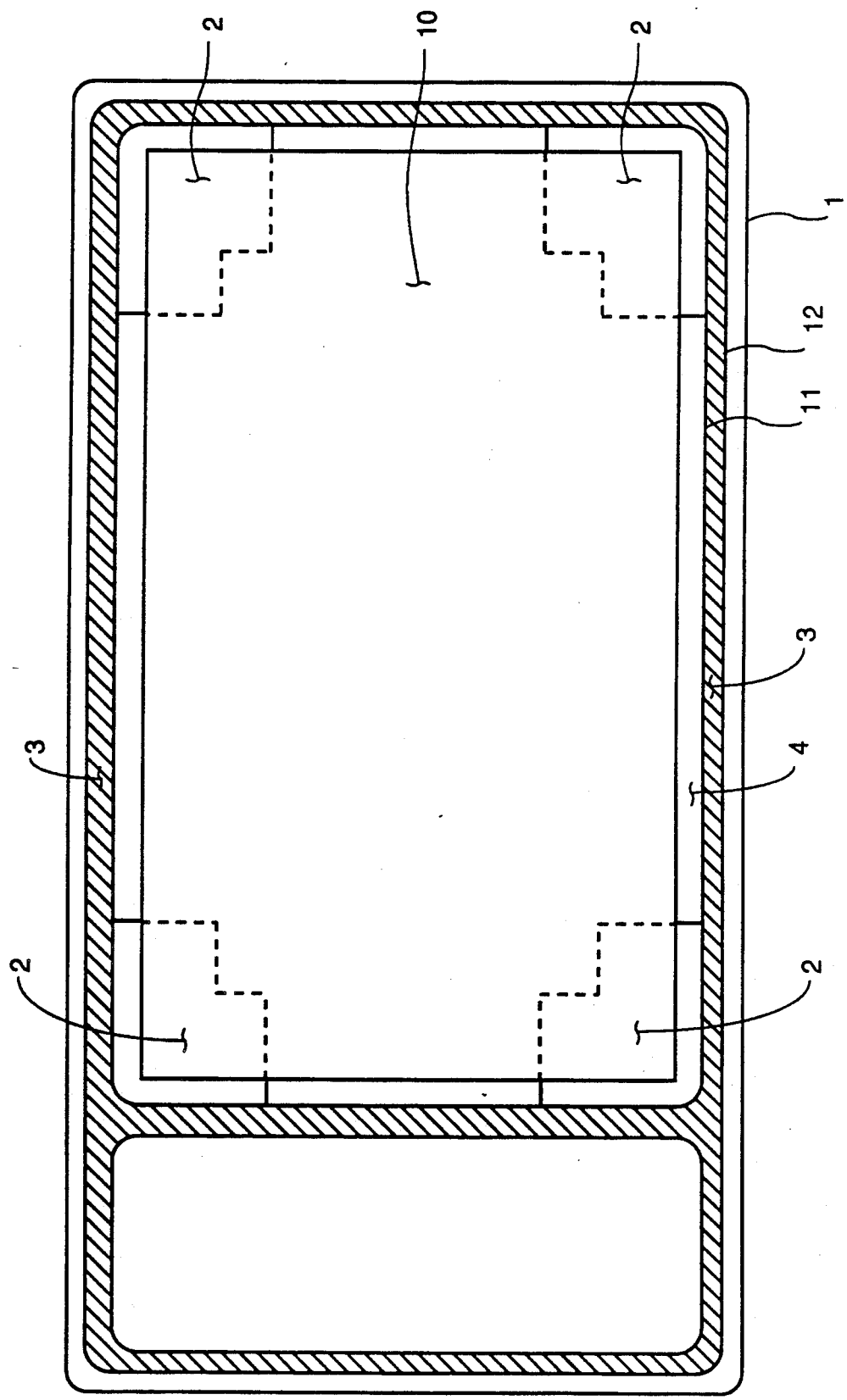
FIG. 2 is a front view illustrating the resilient shock mounts at the corners of the LCD assembly.

FIG. 2 illustrates a front view of the LCD mounting structure. Four shock mounts 2 are shown in the four corners of LCD assembly 10. The transparent overlay 4 is placed directly over LCD assembly 10. The bezel 3 outlines and frames LCD assembly 10. The transparent overlay 4 is joined with bezel 3 at line 11 and bezel 3 is joined to the housing 1 at line 12.

This assembled mounting structure allows the LCD glasses 7 and 8 to float with respect to the housing 1. The housing 1 may be deformed or otherwise stressed by dropping or compressing its associated portable computer, but the LCD glasses 7 and 8 remain flat and free from the shock and load. Effectively, the mounting structure suspends the LCD glasses 7 and 8 and leaves the glass planar. The effectiveness of this mounting structure was tested by dropping two prototype portable computers having the present invention incorporated therein from a 2-story building onto concrete several times. The LCD assemblies survived the crash without damage. Moreover, the portable computer was compressed by having a user sit on several chairs of various types while the computer was in the user's back pocket (a potential mishap certain to occur with pocket size portable computers), thus applying stress to the computer. An inspection of the portable computer after the compression test revealed no damage to the LCD assembly. Thus, the LCD mounting structure absorbs the shock associated with dropping or other day-to-day handling of a portable computer and thereby protects the LCD (glass and circuitry) from damage.

I claim:

1. A liquid crystal display (LCD) mounting structure comprising:
    an LCD assembly;
    a plurality of resilient shock mounts mounted on the edges of said LCD assembly;
    a housing which houses said LCD assembly with said plurality of shock mounts; and
    a 3-dimensional frame comprising a top portion and sides, said sides extending downward from said top portion, adjacent ones of said sides being securely joined to each other and to said top portion to form said rigid 3-dimensional frame, at least said shock mounts being held by said rigid 3-dimensional frame.

2. A liquid crystal display (LCD) mounting structure according to claim 1, wherein said LCD assembly comprises a top glass plate having a polarizer formed thereon and a lower glass plate having a polarizer with a reflector formed thereon.

3. A liquid crystal display (LCD) mounting structure according to claim 1, wherein said LCD assembly has a row driver printed circuit board, a column driver printed circuit board, and flexible circuitry associated with it in said housing.

4. A liquid crystal display (LCD) mounting structure according to claim 1, wherein said resilient shock mounts are made from a material which is selected from the group consisting of injection moldable and compression moldable silicone rubbers having a low durometer ranging from 15 to 20.

5. A liquid crystal display (LCD) mounting structure according to claim 4, wherein said resilient material is Sorbothane TM.

6. A liquid crystal display (LCD) mounting structure according to claim 1 wherein said 3-dimensional frame and said housing are hermetically sealed together, thereby forming a chamber in which said LCD assembly is located.

7. A liquid crystal display (LCD) mounting structure according to claim 6 in which said chamber is evacuated.

8. The LCD mounting structure according to claim 6, wherein said top portion comprises a bezel having an inside perimeter and an outside perimeter, said bezel being joined with said sides along said outside perimeter of said bezel.

9. The LCD mounting structure according to claim 8, wherein said top portion further comprises a transparent overlay, said overlay being joined to said bezel along said inside perimeter of said bezel.

10. The LCD mounting structure according to claim 9, wherein said 3-dimensional frame is joined with said housing along said outside perimeter of said bezel.

11. A method of making a liquid crystal display (LCD) mounting structure comprising:
    mounting a plurality of resilient shock mounts on edges of an LCD assembly;
    installing said LCD assembly with said plurality of shock mounts into a housing;
    placing a 3-dimensional frame into said housing, said 3-dimensional frame comprising a top portion and sides, said sides extending downward from said top portion, said sides being fitted over said LCD assembly and said shock mounts, thereby compressing said shock mounts; and
    joining together said 3-dimensional frame to said housing while said shock mounts are under compression.

12. A method of making a liquid crystal display (LCD) mounting structure according to claim 11, wherein said shock mounts are compressed approximately 25% prior to joining.

13. A method of making a liquid crystal display (LCD) mounting structure according to claim 11, wherein said top portion and said sides are molded as one part.

14. A method of making a liquid crystal display (LCD) mounting structure according to claim 11, wherein said top portion and said sides are welded together ultrasonically.

15. A method of making a liquid crystal display (LCD) mounting structure according to claim 11, wherein said top portion and said sides are bonded together chemically.

16. A method of making a liquid crystal display (LCD) mounting structure according to claim 11, wherein said 3-dimensional frame is joined to said housing by ultrasonic welding.

17. A method of making a liquid crystal display (LCD) mounting structure according to claim 11, wherein said 3-dimensional frame is joined to said housing by chemical bonding.

18. A method of making a liquid crystal display (LCD) mounting structure according to claim 11 wherein said LCD assembly comprises a top glass plate having a polarizer formed thereon and a lower glass plate having a polarizer with a reflector formed thereon.

19. A method of making a liquid crystal display (LCD) mounting structure according to claim 11, wherein said LCD assembly has a row driver printed circuit board, a column driver printed circuit board, and flexible circuitry associated with it in said housing.

20. A method of making a liquid crystal display (LCD) mounting structure according to claim 11, wherein said resilient shock mounts are made from a material selected from the group consisting of injection moldable and compression moldable silicone rubbers having a low durometer ranging from 15 to 20.

21. A method of making a liquid crystal display (LCD) mounting structure according to claim 20, wherein said resilient material is Sorbothane TM.

22. A method of making a liquid crystal display (LCD) mounting structure according to claim 11, wherein said 3-dimensional frame comprises:
   a bezel having an inside perimeter and an outside perimeter; and
   sides extending perpendicularly from said bezel and being joined to said bezel, said sides being integrally connected to said outside perimeter of said bezel.

23. A method of making a liquid crystal display (LCD) mounting structure according to claim 22, wherein said 3-dimensional frame is joined with said housing along said outside perimeter of said bezel.

24. A method of making a liquid crystal display (LCD) mounting structure according to claim 22, wherein said 3-dimensional frame further comprises a transparent overlay, said overlay being joined to said bezel along said inside perimeter of said bezel.

25. A method of making a liquid crystal display (LCD) mounting structure according to claim 24, wherein said 3-dimensional frame is hermetically sealed to said housing, thereby forming a chamber in which said LCD assembly is located.

26. A method of making a liquid crystal display (LCD) mounting structure according to claim 25, wherein said chamber is evacuated.

* * * * *